US012771466B2

(12) United States Patent
Stanly et al.

(10) Patent No.: US 12,771,466 B2
(45) Date of Patent: Oct. 20, 2026

(54) AUDIO DATA SHARING METHOD FOR RADIO BROADCASTING

(71) Applicant: INNTOT TECHNOLOGIES PRIVATE LIMITED, Kerala (IN)

(72) Inventors: Geethu Stanly, Kerala (IN); Aswin Karayee, Kerala (IN); Sahira Enchakkudy Kunjumuhammed, Kerala (IN); Leo Thomas, Kerala (IN); Nikhil Cherian, Kerala (IN)

(73) Assignee: Inntot Technologies Private Limited, Kerala (IN)

( * ) Notice: Subject to any disclaimer, the term of this patent is extended or adjusted under 35 U.S.C. 154(b) by 312 days.

(21) Appl. No.: 18/229,394

(22) Filed: Aug. 2, 2023

(65) Prior Publication Data

US 2024/0348357 A1 Oct. 17, 2024

(30) Foreign Application Priority Data

Apr. 11, 2023 (IN) ............................. 202341026928

(51) Int. Cl.
*H04H 20/02* (2008.01)
*H04H 20/62* (2008.01)

(52) U.S. Cl.
CPC ............ *H04H 20/02* (2013.01); *H04H 20/62* (2013.01)

(58) Field of Classification Search
CPC ........... H04W 4/40; H04W 4/44; H04W 4/46; H04B 1/3822; H04H 20/60
See application file for complete search history.

(56) References Cited

U.S. PATENT DOCUMENTS 9,565,625 B1 * 2/2017 MacNeille ............ H04W 48/18
9,893,825 B1 * 2/2018 Rao ......................... H04W 4/80
10,172,009 B1 1/2019 Altay et al.
2016/0077789 A1 3/2016 Hampiholi et al.
2017/0032402 A1 * 2/2017 Patsiokas ........... G06Q 30/0207
2017/0104824 A1 * 4/2017 Bajwa ..................... H04W 4/80
2020/0204280 A1 * 6/2020 Thagadur Shivappa .................... G01S 19/48
2021/0185484 A1 6/2021 Zhou
2023/0208541 A1 * 6/2023 Su .......................... H04H 60/42 455/3.06

FOREIGN PATENT DOCUMENTS

KR 20140026789 A 3/2014
KR 20160029323 A 3/2016

OTHER PUBLICATIONS

Špitálová Zuzana, "Vehicle-to-Everything Communication", Communications—Scientific Letters of the University of Zilina, Slovakia, Jan. 2023, vol. 25, No. 1, pp. C24-C35.

* cited by examiner

*Primary Examiner* — Wen W Huang
(74) *Attorney, Agent, or Firm* — Millen, White, Zelano & Branigan P.C.; William F. Nixon

(57) ABSTRACT

An audio data sharing method for radio broadcast systems includes sharing audio data using vehicle-to-vehicle communication and vehicle-to-infrastructure communication between vehicles and infrastructure units in low reception areas for radio broadcasting. The audio data sharing occurs by means of tuner leasing. The method also includes forming a framework for message sharing between the different units. The method enables uninterrupted audio data availability in low reception areas for enhancing the customer experience.

2 Claims, 4 Drawing Sheets

| 200 | 201 | 202 | 203 |
|---|---|---|---|
| Device ID | Tuned station | Broadcast standard | Extra Tuner availability |

Fig 2

| | | | |
|---|---|---|---|
| 200<br>Device ID | 201<br>Tuned station | 202<br>Broadcast standard | 203<br>Extra Tuner availability |

Fig. 3

| | | | |
|---|---|---|---|
| 300<br>Receiver device ID | 301<br>Transmitter device ID | 302<br>Request type | 303<br>Station information |

Fig. 4

| | | | | | |
|---|---|---|---|---|---|
| 400<br>Transmitter device ID | 401<br>Station information | 402<br>Audio codec | 403<br>Audio data | 404<br>Audio Data length | 405<br>Packet ID |

Fig. 5

| | | |
|---|---|---|
| 500<br>Transmitter device ID | 501<br>Receiver device ID | 502<br>Error Response |

AUDIO DATA SHARING METHOD FOR RADIO BROADCASTING

FIELD OF INVENTION

The present invention relates to the field of radio broadcasting, more specifically to the field of Vehicle-to-Vehicle data sharing technique, that can be used to share audio data when encountering low reception areas for radio broadcasting.

BACKGROUND OF THE INVENTION

Radio broadcasting is the transmission of audio by radio waves from transmitters to radio receivers. In land-based systems, the radio waves are transmitted from land-based stations, while in satellite communication, the satellites transmit the radio signals to the receivers. The receivers can tune in to the broadcast signal and receive the audio signal. There are different radio broadcast standards that specify the different modulation techniques, the type of carrier waves, etc.

A tuner is a radio receiver or an audio subsystem, which can receive radio frequencies in broadcasting, and can convert the carrier frequency bandwidth to one suitable for demodulation processing and subsequent output. The word tuning refers to the adjusting of the receiver tuner to detect the desired radio signal carrier frequency of a particular radio station.

Vehicle-to-Vehicle (V2V) communication is a wireless data sharing technique through which vehicles can share data on traffic issues, crashes, vehicle speed, etc. Traditional V2V communication consists of wireless systems fixed to the vehicles that can transmit data to around 300 m. Typically used to inform vehicles about the possibilities of a crash, this system can be utilized to perform different functions to extend their possibilities. V2X (Vehicle to Everything) extends this concept to perform communication between smartphones, control centers, and other entities with any kind of vehicle.

When vehicles pass through a tunnel or any similar areas with low signal strength they will be unable to receive signals and hence users will experience audio interruption from their radio services. Not only do radio stations transmit entertainment data, but they also carry highly useful information regarding alerts, warnings, weather, local government alerts, etc.

Hence such data should be made well available to vehicle users for their safety and convenience. In cases of navigation applications, such traffic/accident information are important for changing routes, etc. Thus, there exists a need for a signal availing mechanism in low signal areas.

Current patents on radio broadcasting techniques are discussed below:

The U.S. Pat. No. 9,893,825B1 relates to the application generally relates to preset radio stations stored in a vehicle and more specifically, to sharing preset radio stations between vehicles using a wireless communications network. Manual re-programming process can be tedious, time-consuming, and frustrating, especially when there are a large number of unfamiliar radio stations to sift through in a given area. This patent seeks to share the preset values between vehicles. Our present invention discusses a method to share audio data between vehicles and RSU in order to provide uninterrupted audio in low reception areas by also leasing out a tuner for vehicles in low signal areas.

The patent U.S. 20080200121A1 seeks to improvise V2X communication and V2V communication and enhance the safety of road traffic. This patent is for acquiring information of a wide range in real-time, which is necessary for the traveling vehicle and enhancing safety on road traffic and convenience of the user by effectively cooperating with both the V2X and the V2V communication. Our present invention addresses the problem of audio breakage experienced by a vehicle passing through a low reception area by sending audio data from a vehicle/infrastructure until in a valid signal area to vehicles in low reception areas.

In the study paper Cognitive Radio Assisted NOMA Broadcasting for 5G Cellular V2X Communications: Model of Roadside Unit Selection and SWIPT, the outage performance is a significant problem to implement the Cognitive Radio (CR) paradigm in the Vehicle to Everything (V2X) networks. In this study, the RSU selection scheme is adopted. This paper presents a model of a system with Simultaneous Wireless Information and Power Transfer (SWIPT) and a CR-enabled V2X-NOMA network. Here an RSU selection scheme to improve outage performance is adopted. This is related to the V2X standard and it has no data sharing between vehicles/infrastructure. Our present invention is to share audio data between vehicles/infrastructure using V2X.

Our present invention seeks to overcome the problems of low signal/signal breakage in low signal areas like tunnels, roads running between high rise buildings, hilly, underground, and remote areas and such, by using a method of audio data sharing in vehicle-to-vehicle and vehicle-to-infrastructure communication. Our present invention addresses the problem of audio breakage experienced by a vehicle passing through a low reception area by sending audio data from a vehicle/infrastructure unit in a valid signal area. The vehicle in the low reception area can lease out a tuner from the vehicle or infrastructure unit in the valid signal area to tune to its required channel.

OBJECTIVE OF THE INVENTION

The main objective of our present invention is to provide a method of sharing audio data between vehicles and between vehicles and road side units to facilitate better reception in low reception areas for automotive radio receivers. The other objective of our present invention is to provide a method of leasing tuners so that audio data services can be enjoyed in an uninterrupted manner.

Another objective of our present invention is to provide a system/protocol of communication between different entities like vehicle to vehicle or vehicle to infrastructure so that audio data sharing can take place effectively.

SUMMARY OF THE INVENTION

The following summary is provided to facilitate a clear understanding of the new features in the disclosed embodiment and it is not intended to be a full, detailed description. A detailed description of all the aspects of the disclosed invention can be understood by reviewing the full specification, the drawing and the claims, and the abstract, as a whole.

Audio breakage in low reception areas is one of the main issues faced in broadcast radio systems. The present invention relates to a method directed to sharing audio data between vehicles and between vehicles and road side units to facilitate better reception in low reception areas for automotive radio receivers. A vehicle receiving a valid signal can send the audio data by V2V communication which in turn can be used by a vehicle in a low reception area. Roadside transceiver units placed in a valid signal area can make use of V2I communication to send the audio signals for vehicles in low reception areas. A vehicle/infrastructure unit with multiple tuners can lease a tuner to tune to a station required by a vehicle in a low reception area. It can also send data like the availability of extra tuners and current tuned frequency that can be used by other vehicles.

Different radio broadcast standards with respect to the present invention can be DAB, DRM, CDR, HD Radio, FM or AM.

BRIEF DESCRIPTION OF THE DRAWINGS

The manner in which the present invention is formulated is given a more particular description below, briefly summarized above, may be had by reference to the components, some of which are illustrated in the appended drawing It is to be noted; however, that the appended drawing illustrates only typical embodiments of this invention and are therefore should not be considered limiting of its scope, for the system may admit to other equally effective embodiments.

Throughout the drawings, the same drawing reference numerals will be understood to refer to the same elements and features.

Figure 1:
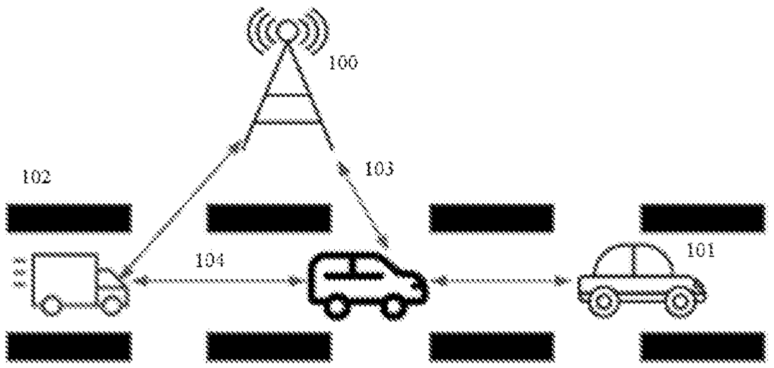
Figure 6:
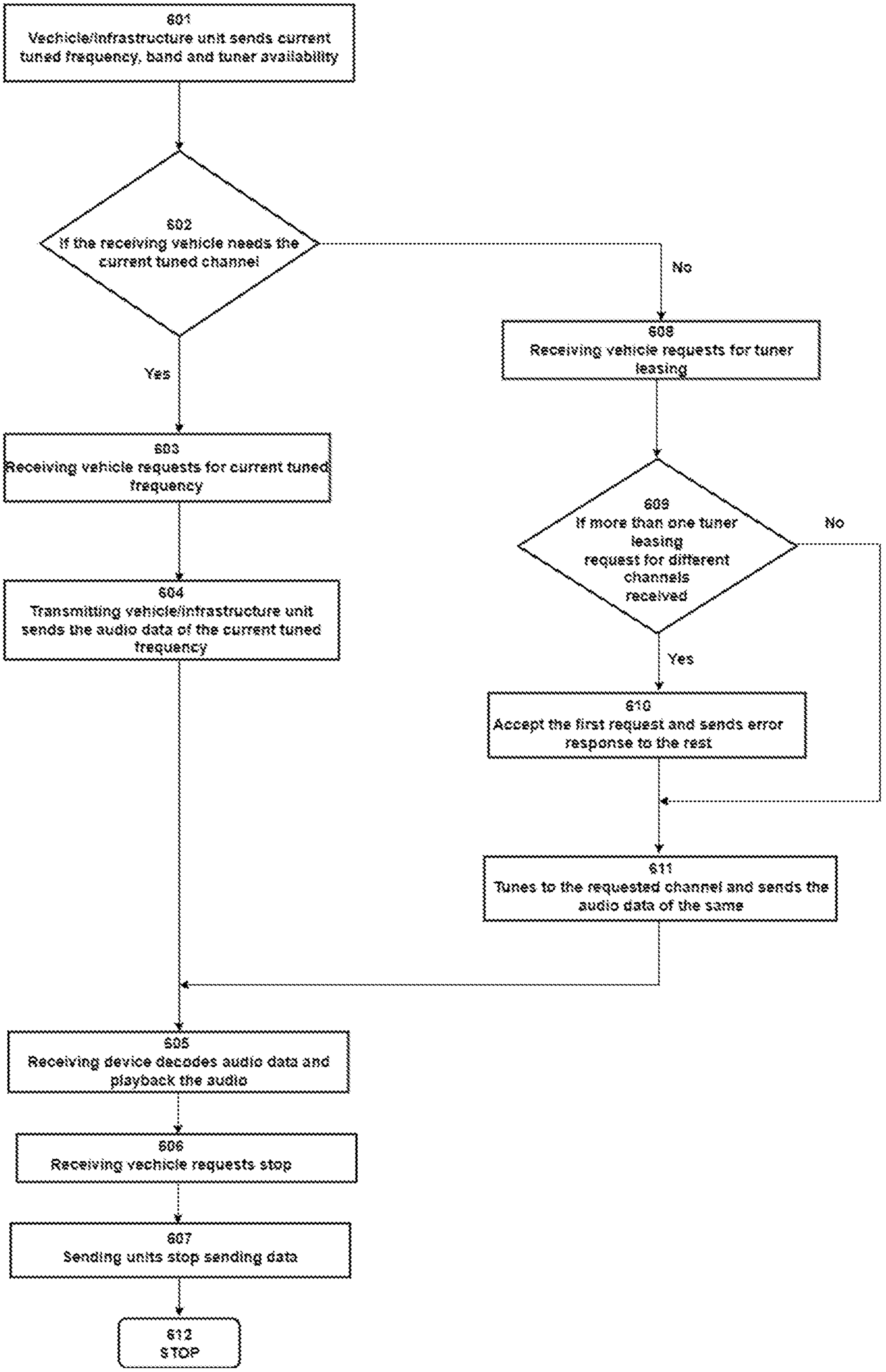

The features and advantages of the present invention will become more apparent from the following detailed description along with the accompanying figures, which form a part of this application and in which:

FIG. 1: Block Diagram describing the components of our audio data sharing method for radio broadcasting system in accordance with our present invention;

FIG. 2: Block Diagram describing the structure of V2V/V2I radio information frame of our audio data sharing method for radio broadcasting system in accordance with our present invention;

FIG. 3: Block Diagram describing the structure of V2V/V2I request frame of our audio data sharing method for radio broadcasting system in accordance with our present invention;

FIG. 4: Block Diagram describing the structure of V2V/V2I data frame of our audio data sharing method for radio broadcasting system in accordance with our present invention;

FIG. 5: Block Diagram describing the structure of V2V/V2I error message frame of our audio data sharing method for radio broadcasting system in accordance with our present invention;

FIG. 6: Flow chart describing the process of our audio data sharing method for radio broadcasting system in accordance with our present invention.

REFERENCE NUMERALS

100—Road side Unit
101—Vehicle
102—Signal blocking entities
103—V2I Communication
104—V2V Communication
200—Device ID
201—Tuned station
202—Broadcast standard
203—Extra Tuner availability
300—Receiver device ID
301—Transmitter device ID
302—Request type
303—Station information
400—Transmitter device ID
401—Station information
402—Audio codec
403—Audio data
404—Audio Data length
405—Packet ID
500—Transmitter device ID
501—Receiver device ID
502—Error Response
601—Vehicle/Infrastructure unit sends current tuned frequency, band and tuner availability
602—If the receiving vehicle needs the current tuned channel
603—Receiving vehicle requests for current tuned frequency
604—Transmitting vehicle/infrastructure unit sends the audio data of the current tuned frequency
605—Receiving device decodes audio data and playback the audio
606—Receiving vehicle requests stop
607—Sending units stop sending data
608—Receiving vehicle requests for tuner leasing
609—If more than one tuner leasing for different channels received
610—Accept the first request and sends error response to the rest
611—Tunes to the requested channel and sends the audio data of the same
612—Stop

DETAILED DESCRIPTION OF THE INVENTION

The principles of operation, design configurations and evaluation values in these non-limiting examples can be varied and are merely cited to illustrate at least one embodiment of the invention, without limiting the scope thereof.

The embodiments disclosed herein can be expressed in different forms and should not be considered as limited to the listed embodiments in the disclosed invention. The various embodiments outlined in the subsequent sections are constructed such that it provides a complete and thorough understanding of the disclosed invention, by clearly describing the scope of the invention, for those skilled in the art.

Throughout this specification, various indications have been given as to preferred and alternative embodiments of the invention. It should be understood that it is the appended claims, including all equivalents, which are intended to define the spirit and scope of this invention.

The current embodiment of the present invention aims at providing a method for sharing audio data between vehicles and between vehicles and roadside units to facilitate better reception in low reception areas. V2V and V2I communication can be used by automobiles and infrastructure units in valid signal areas to send information like the current tuned frequency and band to the network. It can also send data like the availability of extra tuners that can be used by other vehicles.

The vehicles receiving this information can either request for the currently tuned frequency if they were also listening to the same channel or can request to lease out an available tuner to tune to their required channel. If a request for the current tuned channel is received the sending unit will send the audio signal of that particular channel to the network. If a vehicle requests to lease out a tuner to play a particular station, the vehicle/Infrastructure unit tunes to the requested station and sends the audio signal of the same to the network. If a unit receives a tuner request from more than one vehicle the first requested vehicle will get the tuner and other vehicles will receive an error message.

The transmitting vehicle/infrastructure unit will have a list of how many vehicles receiving its data with the vehicle ID of the receiving vehicle. It will continue to send the audio until the last receiving vehicle requests to stop. The stop request will be a request message with the request type 'stop'.

The V2V and V2I communication of audio data sharing in radio broadcasting systems in accordance with our present invention as shown in FIG. 1 is explained as follows: A vehicle (101) will be unable to receive radio signals when it is passing through a tunnel (102) or other areas with low signal strength. This situation creates inconvenience for users. A solution to this problem is directed to sharing audio data between vehicles (104) and between vehicles and road side units (100) (103) to facilitate better reception in low reception areas.

The structure of V2V/V2I radio information frame in accordance with one embodiment of our present invention is shown in FIG. 2. V2V (104) and V2I (103) communication can be used by cars in valid signal areas and by infrastructure units (100) to send information like the current tuned frequency, service identifier (201) and band (202) to the network. It can also send data like the availability of extra tuners (203) that can be used by other vehicles. The sending vehicle also adds an identification number of itself (200) along with the other information so that the receiving vehicle can identify which vehicle or RSU has a particular channel or tuner available.

The structure of V2V/V2I request frame in accordance with one embodiment of our present invention is shown in FIG. 3. The vehicles receiving this information can either request for the current tuned frequency if they were also listening to the same channel or can request to lease out an available tuner to tune to their required channel. The receiving vehicle will place the request based on the sending vehicle/infrastructure unit ID (300) and it will also send an ID of itself (301) along with the request type (302) and the required station information (303) so that it can be identified by the vehicle/infrastructure unit sending the audio. The request type can be type 1—which is a request for the current tuned frequency, type 2—which requests tuner leasing or type 3—which is a stop request if the requesting vehicle is already receiving audio data. The station information will be null for request types 1 and 3, it will contain the required frequency and band for request type 2. If a request for the current tuned channel is received the sending unit will send the audio signal of that particular channel to the network. If a vehicle requests to lease out a tuner to play a particular station, the vehicle/Infrastructure unit tunes to the requested station and sends the audio signal of the same to the network. If a unit receives a tuner request from more than one vehicle the first requested vehicle will get the tuner and other vehicles will receive an error message.

The structure of V2V/V2I data frame in accordance with one embodiment of our present invention is shown in FIG. 4. The sending vehicle/infrastructure unit sends the audio data of the tuned channel to the receiving vehicle through V2V/V2I and will also send its own ID (400) in the frame so that the receiving vehicle can identify the required content. This frame also contains the audio codec (402) used for encoding the audio data (403) and the number of bytes of audio data (404) contained in the frame. A Packet identifier (405) will be present in the data frame which can be used by the receiver to confirm whether all the packets are received.

V2V and V2I communication can be used by cars and infrastructure units in valid signal areas to send information like the current tuned frequency and band to the network. It can also send data like availability of extra tuners that can be used by other vehicles. The vehicles receiving this information can either request for the current tuned frequency if they were also listening to the same channel or can request to lease out an available tuner to tune to their required channel. If a request for the current tuned channel is received the sending unit will send the audio signal of that particular channel to the network. If a vehicle requests to lease out a tuner to play a particular station, the vehicle/Infrastructure unit tunes to the requested station and sends the audio signal of the same to the network. If a unit receives a tuner request from more than one vehicle the first requested vehicle will get the tuner and other vehicles will receive an error message.

The structure of V2V/V2I error message frame in accordance with one embodiment of our present invention is shown in FIG. 5. This message is sent if the tuner request received is more than the number of available tuners. In this case the tuner will be provided for the first requesting vehicle and all the other requesting vehicles will receive the error message. This message frame contains the transmitting device ID (500), receiver device ID (501) and an error response (502) to show the tuner unavailability. The transmitting vehicle/infrastructure unit will have a list of how many vehicles receiving its data with the vehicle ID of the receiving vehicle. It will continue to send the audio until the last receiving vehicle requests to stop. The stop request will be a request message with the request type 'stop'.

The flow chart on the process as illustrated in FIG. 6 the vehicle/infrastructure unit of the present invention sends current tuned frequency, band and tuner availability (601); if the receiving vehicle needs the current tuned channel (602) then the receiving vehicle requests for current tuned frequency (603); then the transmitting vehicle/infrastructure unit sends the audio data of the current tuned frequency (604); receiving device decodes audio data and playback the audio (605); receiving vehicle requests stop (606) and sending units to stop sending the data (607); and it will stop (612).

If the receiving vehicle requires a different channel (602), then the receiving vehicle requests for tuner leasing (608) and if more than one tuner leasing request for different channels is received (609) it needs to accept the first request and sends an error response to the rest (610); and tunes to the requested channel and sends the audio data of the same (611) then receiving device decodes audio data and playback the audio (605); receiving vehicle requests stop (606) and sending units to stop sending the data (607); and it will stop (612).

If the number of tuner leasing request matches the number of available tuners (609) then it tunes to the requested channel and sends the audio data of the same (611) then receiving device decodes audio data and playback the audio (605); receiving vehicle requests stop (606) and sending units to stop sending the data (607); and it will stop (612).

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope of the invention as claimed.

We claim:

1. An audio data sharing method for radio broadcasting systems that comprises:

sharing audio data using vehicle-to-vehicle (V2V) communication (104) and vehicle-to-infrastructure (V2I) unit communication (103) between units in a plurality of vehicles (101) and an infrastructure unit (100) in a low reception area for radio broadcasting, by means of tuner leasing; and forming a framework for message sharing between the units in the plurality of vehicles, wherein a structure of a V2V/V2I radio information frame used between the units of the plurality of vehicles and the infrastructure unit consists of a device identification (200), a tuned station (201), a broadcast standard (202), and an extra tuner availability (203).

2. An audio data sharing method for radio broadcasting systems that comprises:

sharing audio data using vehicle-to-vehicle (V2V) communication (104) and vehicle-to-infrastructure (V2I) unit communication (103) between units in a plurality of vehicles (101) and an infrastructure unit (100) in a low reception area for radio broadcasting, by means of tuner leasing; and forming a framework for message sharing between the units in the plurality of vehicles, wherein a structure of a V2V/V2I request frame sent between two or more of the units of the plurality of vehicles consists of a receiver device identification (300), a transmitter device identification (301), a request type (302), and station information (303).

* * * * *